US012579595B2

(12) United States Patent
Oelert et al.

(10) Patent No.: US 12,579,595 B2
(45) Date of Patent: Mar. 17, 2026

(54) BACKEND SYSTEM FOR A PASSENGER TRANSPORT SYSTEM

(71) Applicant: Scheidt & Bachmann GmbH, Mönchengladbach (DE)

(72) Inventors: Kai Oelert, Walldorf (DE); Marian Kaššovic, Bratislava (SK)

(73) Assignee: Scheidt & Bachmann GmbH, Mönchengladbach (DE)

( * ) Notice: Subject to any disclaimer, the term of this patent is extended or adjusted under 35 U.S.C. 154(b) by 340 days.

(21) Appl. No.: 18/341,361

(22) Filed: Jun. 26, 2023

(65) Prior Publication Data

US 2024/0005436 A1 Jan. 4, 2024

(30) Foreign Application Priority Data

Jun. 30, 2022 (DE) ..................... 10 2022 116 347.4

(51) Int. Cl.
*G06Q 50/40* (2024.01)
*G06Q 30/04* (2012.01)

(52) U.S. Cl.
CPC ............. *G06Q 50/40* (2024.01); *G06Q 30/04* (2013.01)

(58) Field of Classification Search
CPC ........ G06Q 50/40; G06Q 30/04; G06Q 10/02; G07B 15/02; G07C 9/27
USPC .......................................................... 705/34
See application file for complete search history.

(56) References Cited

U.S. PATENT DOCUMENTS

2008/0154623 A1 6/2008 Derker et al.
2013/0262222 A1 10/2013 Gibson et al.
2014/0289026 A1 9/2014 Neumann
2014/0350979 A1 11/2014 Paetzold et al.
2015/0178698 A1 6/2015 Schulz et al.
2015/0324708 A1 11/2015 Skipp et al.
(Continued)

FOREIGN PATENT DOCUMENTS

DE 10 2021 125 748 A1 4/2022
EP 1 638 052 A1 3/2006
(Continued)

OTHER PUBLICATIONS

German Patent Office, Office Action, Application No. 10 2022 116 347.4, dated Feb. 27, 2024, 13 pages (in German).
(Continued)

*Primary Examiner* — Russell S Glass
(74) *Attorney, Agent, or Firm* — Merchant & Gould P.C.

(57) ABSTRACT

A backend system for a passenger transport system includes: data memory for storing at least one user data set containing at least one electronic medium identifier authorizing the execution of a transport trip and at least one first transport usage condition linked to the electronic medium identifier; a receiving module configured to receive a change data set containing at least one second transport usage condition, at least one first time date and at least one user identifier for identifying a stored user data set; a change module configured to change the linkage between the electronic medium identifier stored in the identified user data set and the first transport usage condition for at least one future transport trip; a trip reconstruction module configured to reconstruct an executed transport trip at least based on a received user identifier; and a generation module configured to generate a billing data set.

8 Claims, 3 Drawing Sheets

(56) References Cited

U.S. PATENT DOCUMENTS

| | | | | |
|---|---|---|---|---|
| 2017/0046681 | A1 | 2/2017 | Dixon et al. | |
| 2017/0053458 | A1 | 2/2017 | Smith et al. | |
| 2017/0200149 | A1 | 7/2017 | Antunovic et al. | |
| 2018/0164976 | A1 | 6/2018 | Ho | |
| 2019/0058591 | A1 | 2/2019 | Sharpe et al. | |
| 2019/0172043 | A1 | 6/2019 | Nair et al. | |
| 2020/0272954 | A1 | 8/2020 | Serra et al. | |
| 2022/0164715 | A1* | 5/2022 | Troll .................... | G06Q 20/145 |
| 2022/0207593 | A1* | 6/2022 | Swanson ............ | G06Q 20/0457 |

FOREIGN PATENT DOCUMENTS

| | | | | | |
|---|---|---|---|---|---|
| EP | 3 779 902 | A1 | | 2/2021 | |
| EP | 4 002 306 | A1 | | 5/2022 | |
| JP | 2008509471 | A | * | 3/2008 | ............. G06Q 10/02 |
| KR | 20150016099 | A | * | 2/2015 | ............. G06Q 50/14 |
| WO | 2004/051580 | A1 | | 6/2004 | |

OTHER PUBLICATIONS

European Patent Office, Search Report, Application No. 23177506.5, dated Nov. 28, 2023, 9 pages (in German).

* cited by examiner

BACKEND SYSTEM FOR A PASSENGER TRANSPORT SYSTEM

CROSS-REFERENCE TO RELATED APPLICATIONS

This application claims the benefit of German patent application No. 10 2022 116 347.4, filed Jun. 30, 2022, the disclosures of which are incorporated herein by reference in their entirety.

TECHNICAL FIELD

The application relates to a backend system for a passenger transport system. Furthermore, the application relates to an interface device, a passage barrier, a passenger transport system and a method for operating a backend system.

BACKGROUND ART

A passenger transport system, in particular a public passenger transport system, serves to transport passengers and users, respectively, by means of passenger transport vehicles (hereinafter referred to as transport vehicles). Exemplary and non-exhaustive transport vehicles are rail vehicles (e.g., train, subway, streetcar etc.), motor vehicles (e.g., bus), but also water vehicles and airplanes. A trip of a user with a transport vehicle from a trip start point to a trip end point is referred to herein as a transport trip.

As a rule, a ticket medium is required for an authorized respectively permissible use of a transport trip respectively a corresponding transport service. The ticket medium can generally indicate that the user is authorized to make the transport trip. In prior art passenger transport systems, for example, paper tickets can be used as ticket media, which must be purchased at a ticket vending machine or the like prior to the start of the trip.

It is also known that technically readable data is stored in ticket media, which comprise specifications about the validity of the respective ticket medium for the execution of a transport trip. In principle, passenger transport systems are also known from the prior art that use proprietary ticket media (also referred to as "closed loop" ticket systems) and/or open ticket media (corresponding systems are also referred to as "open loop" systems). Hybrid passenger transport systems, in which both types of ticket media can be used, are also known.

The advantage of passenger transport systems with an open architecture and open ticket media, respectively, over passenger transport systems with a closed architecture and (exclusively) proprietary ticket media, respectively, is, in particular, that they are more flexible in comparison.

Users and passengers, respectively, can use different ticket media as user identification elements when using a transport vehicle for a transport trip, such as tokens, chip cards (respectively smart cards), credit cards, bank cards (or the like), cell phones, personal digital assistants (PDAs), tablet PCs, integrated circuit chips, electronic passports, electronic identification documents, etc. In particular, an electronic medium identifier stored and readable in the ticket medium can be used for authentication of the user and, for example, subsequent billing of the executed transport trip.

It shall be understood that the operator of a passenger transport system can specify which user identification elements may actually be used and which are excluded.

A passenger transport system with an open architecture respectively with open ticket media usually comprises a plurality of interface devices, in particular in the form of validator devices. A validator device (also referred to as validator) can be arranged in particular in a (transport) stop area (e.g., stop, station, etc.) and/or in a transport vehicle.

In particular, a validator device is configured to validate a ticket medium by detecting the electronic medium identifier stored in a storage means of a ticket medium.

For proper respectively authorized use of a transport vehicle, a user can, for example, check-in at a validator device located in or in front of the transport vehicle by means of the mobile and portable, respectively, ticket medium upon entering the transport vehicle respectively a stop area. Upon leaving the transport vehicle, a user can check-out in a corresponding manner.

In order to validate the ticket medium, a validator device can comprise at least one detection module, for example in the form of a near field interface, which is configured to read respectively detect the electronic medium identifier stored in the ticket medium from the user identification element. The detected electronic medium identifier can be used to identify a user and, for example, to account for the use of the transport vehicle for the distance traveled between entry and exit.

For each detected electronic medium identifier, a validator data set can be generated and created, respectively, by the validator device, for example as a check-in data set or a check-out data set. A check-in data set or check-out data set may contain at least the detected electronic medium identifier and the detection time point of the electronic medium identifier. A corresponding data set may be at least partially cryptographically encrypted. In a preferred manner, a corresponding data set may be at least partially encrypted in accordance with financial industry security guidelines, as it typically includes card data from credit cards or bank cards. In a preferred manner, a corresponding data set may be at least partially hashed.

A validator device may comprise a transmitting module for transmitting the check-in data set and/or check-out data set to a backend system (also referred to as a "back-office") located remotely from the validator device. The backend system may be formed in the form of one or more servers. The backend system may perform usage billing and/or generate a billing data set based on a check-in data set containing at least the electronic medium identifier and a provided check-out data set containing at least this medium identifier.

A disadvantage of the known passenger transport systems with open ticket media is that the detecting of an electronic medium identifier respectively the validating of the ticket medium is linked to a fixed (first) transport usage condition. This fixed transport usage condition specifies, in particular, a scope of validity of a single electronic medium identifier detected by an interface device. The fixed transport usage condition is usually a transport usage condition in which a single transport trip for an adult user is specified as the scope of validity.

However, if the user requires a different scope of validity, for example to take along an additional person who does not have a ticket medium and/or an additional object (subject to a charge), such as a bicycle, it is still necessary to purchase a corresponding additional paper ticket in the conventional manner at a ticket vending machine. This not only leads to a reduction in user convenience, but also requires the provision of conventional infrastructure for the purchase, output and a validation of conventional paper tickets. Not only does this infrastructure have to be maintained, but it also has to be serviced and the resources (such as the paper for the tickets) have to be provided.

It is noted that embodiments of the present invention create a possibility to increase the user comfort and to reduce the infrastructural effort of the passenger transport system with open ticket media.

SUMMARY OF THE INVENTION

According to a first aspect of the invention, a backend system for a passenger transport system comprises at least one data memory. The data memory is at least configured to store at least one user data set, containing at least one electronic medium identifier authorizing the execution of a transport trip and at least one first transport usage condition linked to the electronic medium identifier. The backend system comprises at least one receiving module. The receiving module is configured to receive a change data set generated by an interface device of the passenger transport system, the change data set containing at least one second transport usage condition, at least one first time date, and at least one user identifier for identifying a stored user data set. The backend system comprises at least one change module. The change module is configured to change the linkage between the electronic medium identifier stored in the identified user data set and the first transport usage condition for at least one (occurring after the first time date) future transport trip based on the received second transport usage condition. The backend system comprises at least one trip reconstruction module. The trip reconstruction module is configured to reconstruct an executed transport trip at least based on a check-in data set received from a validator device of the passenger transport system, the check-in data set containing at least the electronic medium identifier, and a provided check-out data set containing at least the same electronic medium identifier. The backend system comprises at least one generation module. The generation module is configured to generate a billing data set based at least on the reconstructed transport trip and a transport usage condition of the user data set linked with the electronic medium identifier.

By providing, in contrast to the prior art, a backend system according to the application that enables variable linking of a detected electronic medium identifier with different transport usage conditions and thus permits variable use of the passenger transport system, user comfort is increased in a passenger transport system with open ticket media and the infrastructural effort of the passenger transport system is reduced. According to the application, it is made possible to (temporarily) change the scope of validity of the ticket medium, in particular to extend it, for example, in order to take along at least one additional person who does not have a ticket medium and/or an additional object (subject to a charge), such as a bicycle. The purchase of paper tickets can be dispensed with. The infrastructure required for this can at least be reduced. Accordingly, the maintenance effort and resources required for the passenger transport system can be reduced. In addition, throughput at validator devices and/or passage barriers in particular is made possible, and the operational flow ("check-in"/"check-out") is not impeded or not significantly impeded.

The backend system serves for use in a passenger transport system. The backend system (also referred to as the background system) may be formed by at least one computing device, for example in the form of a server. For example, a plurality of distributed computing devices may be provided. Also, a cloud system may be implemented as the backend system.

The backend system comprises one or more (distributed) data memories. A data memory serves for storing in particular a plurality of user data sets (also referred to as user accounts) of in particular registered users respectively their ticket media. A user data set contains at least one electronic medium identifier of a ticket medium and a first transport usage condition linked to the electronic medium identifier. The electronic medium identifier authorizes in particular to execute a transport trip with a passenger transport vehicle (also referred to as transport vehicle) of the passenger transport system from a start stop to a destination stop.

In the present case, a ticket medium is in particular not encoded with a specific transport usage condition respectively a specific ticket product. The electronic medium identifier is in particular an electronic medium identifier selected from the group comprising:

- electronic PAN (primary account number) if the ticket medium is an (open-loop) bank card or (open-loop) credit card (in this case, the storage means may in particular be an NFC storage means),
- electronic card number, if the ticket medium is a closed loop card,
- a UUID (Universally Unique Identifier) if the ticket medium is read via a Bluetooth interface,
- an IMEI (International Mobile Equipment Identity), MAC (Media Access Control) address or other suitable identifier, in particular if the ticket medium is an electronic device.

In particular, the electronic medium identifier is a system-wide unique medium identifier. In particular, an electronic medium identifier is always electronically readable (in a contactless or contact-based manner).

Preferably, an electronic medium identifier, in particular in the form of an electronic PAN, means that this is stored in its entirety only in a storage means of the ticket medium and, in particular, is not readable (completely) optically (or another second storage means) of the ticket medium by a user.

In particular, a detection module, for example with a (contactless or contact-based) interface, of an interface device of the passenger transport system is required for detecting the electronic medium identifier. The (contactless or contact-based) interface corresponds here to the (contactless or contact-based) interface of the ticket medium. Non-exhaustive examples of contact-based ticket medium interfaces are magnetic stripes and Europay Mastercard VISA chips (EMV chips); examples of preferred contactless ticket medium interfaces are Near field Communication interfaces (NFC interfaces) according to ISO 14443.

In particular, a transport usage condition specifies a scope of validity of a single electronic medium identifier detected by an interface device. In other words, a transport usage condition can represent a ticket product.

A detecting operation and reading operation, respectively, may also be referred to as a "tap". In particular, a user may hold respectively tap the ticket medium against or into the interface of an interface device to effect a detecting of the electronic medium identifier. As described above, the tapping can be contactless, preferably by NFC (e.g., smart cards according to ISO 14443), by reading an optical code (e.g., barcode, QR code) containing the electronic medium identifier from a mobile terminal, by reading data from a Bluetooth interface, or contact-based by reading data from a magnetic stripe or from a contact chip from a bank card or credit card.

A detecting of an electronic medium identifier by a validator device respectively the execution of a tap at a validator device upon entering a transport vehicle respectively a stop area causes a checking-in of a user. In a corresponding manner, a detecting of an electronic medium identifier by a validator device respectively the execution of a tap at a validator device upon leaving a transport vehicle respectively a stop area can cause a user to check out.

A first transport usage condition may be, in particular, a basic transport usage condition in which a single transport trip for an adult (respectively full-paying) user is specified as the scope of validity. It shall be understood that another scope of validity may also be specified. In particular, the first transport usage condition may be specified in a registration process. For example, a transport usage condition may additionally depend on the user's membership in a user group (e.g., a particular fare group, such as students, frequent travelers, etc.).

A user data set may preferably contain further user data. According to an embodiment, the at least one further user date may be selected from the group comprising:

user name, address data of the user, in particular a communication address (e.g., e-mail address, mobile phone number, etc.), user password, billing data, and transport service tariff data account data, data of at least one other payment medium.

Furthermore, a trip reconstruction module is provided to reconstruct an executed transport trip. The trip reconstruction is based at least on a check-in data set, which defines the start of the transport trip to be reconstructed, and a check-out data set, which defines the end of the transport trip to be reconstructed. The assignment of a check-in data set to a check-out data set is based in particular on the electronic medium identifier contained in each case. In other words, a transport trip reconstructed by the trip reconstruction module is typically based on a check-in data set and a check-out data set (generated later), with both data sets having the same electronic medium identifier.

A check-in data set is transmitted to the backend system by a validator device. The providing of the check-in data set can comprise a transmitting of the check-in data set by a validator device. Alternatively or additionally, providing a check-out data set may also be performed by the backend system (or a further computing device). For example, sensor data from which the position of the user can be concluded can be provided to the backend system. Based on reference position data (for example, of the transport vehicle and/or stop areas), it can then be concluded whether a user has left the transport vehicle and/or a stop area. A corresponding check-out data set can then be generated by the backend system.

Based on the reconstructed transport trip and a transport usage condition (e.g., a first transport usage condition and/or a second transport usage condition (different from the first transport usage condition)) linked (instantaneously) to the electronic medium identifier, a billing data set can be created. It shall be understood that further data, such as tariff data, etc., may be taken into account.

It has been recognized that a (flexible) assigning respectively linking of an electronic medium identifier with at least two different transport usage conditions is enabled by (temporarily) changing an (existing) linkage between the electronic medium identifier and a first transport usage condition based on a received change data set, at least for a future transport trip. Future means in particular that the transport trip is after a first time date.

A receiving module is configured to receive a change data set generated by an interface device of the passenger transport system, the change data set containing at least one second transport usage condition. The second transport usage condition is different from the first transport usage condition.

In particular, a second transport usage condition may be a further transport usage condition in which a different or additional scope is defined as the scope of validity than in the first transport usage condition. Preferably, in a second transport usage condition a plurality of transport trips for a plurality of adult (respectively full-paying) users can be defined, at least one additional transport trip for a non-adult (respectively non-full-paying) user can be defined, and/or a transport trip for an (adult) user with an additional luggage can be defined, e.g., a bicycle and/or a dog and/or a specific piece of luggage.

In addition to the second transport usage condition, the change data set contains a user identifier that enables identification of a user data set. Preferably, the user identifier can be the electronic medium identifier. Then, in a simple manner, a user data set can be identified from a plurality of user data sets by comparing the electronic medium identifier of the change data set with the respective electronic medium identifiers of the one or more stored user data set(s). In variants of the application, the user identifier can also be another identifier, such as a user name, address data of the user, user password, but also scannable biometric characteristics of a user, such as facial recognition, fingerprint, iris scan and/or the like.

The change data set may also receive a cryptographically encrypted value of the electronic medium identifier as the electronic medium identifier. Preferably, the change data set may contain a hash value of the electronic medium identifier.

The first time date may be a timestamp, in particular the linking time point or transmitting time point of the second transport usage condition.

According to a preferred embodiment, the change data set may be included in and/or form the check-in data set. In this case, the interface device is in particular the validator device, as will be described in more detail.

Preferably, the change data set may additionally comprise a device identifier of the interface device. In particular, the change data set may alternatively or additionally comprise a position date of the interface device. At a minimum, the position date may enable a determining of the position of the interface device at the time the electronic medium identifier is detected by the interface device.

A present change of the linkage between the electronic medium identifier stored in the identified user data set and the first transport usage condition means in particular that at least temporarily, i.e., at least for a future transport trip, the linkage between the electronic medium identifier and the first transport usage condition is replaced by a linkage only with the second transport usage condition or is supplemented by a linkage with the second transport usage condition.

The passenger transport system may comprise a plurality of transport vehicles, such as rail vehicles (e.g., rail, subway, streetcar, etc.), motor vehicles (e.g., bus), water vehicles, and/or aircraft.

According to a further embodiment of the backend system according to the application, the backend system may comprise a transmitting module. The transmitting module may be configured to transmit (via a wireless and/or wired communication network) a change message about the at least one second transport usage condition to the interface device after a change of the linkage. In particular, a change in the scope of validity of the corresponding electronic medium identifier may be confirmed by the change message. For example, the change message may be transmitted in response to a received change data set after a change of the linkage at the interface device that previously transmitted said change data set.

Alternatively or additionally, the backend system may comprise a transmitting module configured to transmit (via a wireless and/or wired communication network) a change message about the at least one second transport usage condition to a communication address stored in the identified user data set after a change of the linkage. For example, the stored communication address may be a communication address (e.g., phone number, email address, etc.) of the user's mobile terminal. In particular, a change in the scope of validity of the corresponding electronic medium identifier may be confirmed by the change message.

According to a further preferred embodiment of the backend system according to the application, the change data set may contain at least one second time date. The second time date may indicate a validity time duration of the second transport usage condition. For example, the second time period may be part of the second transport usage condition. For example, the second time duration may be between 2 hours and 1 month, preferably between 1 day and 1 week.

The backend system may comprise at least one time module configured to set a timer of the backend system according to the second time date (upon receipt of the change data set). A change module may be configured to change the linkage between the electronic medium identifier stored in the identified user data set and the second transport usage condition upon detection of an expiration of the timer, based on the first transport usage condition. In particular, this means that the linkage is changed again.

A (renewed) changing of the linkage between the electronic medium identifier stored in the identified user data set and the second transport usage condition comprises in particular that the linkage between the electronic medium identifier and the second transport usage condition is (re) replaced by the linkage between the electronic medium identifier stored in the identified user data set and the first transport usage condition (or the linkage with the second transport usage condition is deleted respectively removed again). This makes it possible to reduce the required number of change data sets if a changed scope of validity is to be valid for a specific future duration of time.

According to an alternative or additional embodiment of the backend system according to the application, the change data set may contain at least one trip number. The trip number may indicate the number of transport trips (respectively taps) for which the second transport usage condition is valid. For example, the trip number may be between 1 and 10 transport trips, preferably between 2 and 5 transport trips.

The backend system may include at least one counting module configured to set a counter corresponding to the trip number (upon receipt of the change data set). The change module may be configured to change the linkage between the electronic medium identifier stored in the identified user data set and the second transport usage condition upon detection of an expiration of the counter, based on the first transport usage condition. In particular, this means that the linkage is changed again.

A (renewed) changing of the linkage between the electronic medium identifier stored in the identified user data set and the second transport usage condition comprises in particular that the linkage between the electronic medium identifier and the second transport usage condition is (re) replaced by the linkage between the electronic medium identifier stored in the identified user data set and the first transport usage condition (or the linkage with the second transport usage condition is deleted respectively removed again). This makes it possible to reduce the number of required change data sets if a changed scope of validity is to be valid for a specific number of trips.

According to a further embodiment of the backend system according to the application, the backend system may comprise a transmitting module. The transmitting module may be configured to transmit (via a wireless and/or wired communication network) a received change data set to at least one further interface device of the passenger transport system after a change in the linkage. In particular, a plurality of interface devices (for example, all interface devices) of the passenger transport system may be informed of the changed scope of validity (and validity period and/or valid trip number) of a specific electronic medium identifier.

The at least one further interface device of the passenger transport system can store the at least one change data set in a (respective) local data memory. Through this, an electronic medium identifier detected by the at least one further interface device, in particular in the form of a passage barrier and/or validator device, can be checked locally. For example, a passage through a passage barrier can be released or blocked based on this check.

A further aspect of the application is an interface device for a passenger transport system. The interface device is arrangeable in a passenger transport vehicle and/or in a transport stop area. The interface device comprises at least one detection module configured to detect an electronic medium identifier of a ticket medium. The electronic medium identifier is an electronic medium identifier authorizing the execution of a transport trip (with a passenger transport vehicle) and linked to a first transport usage condition. The interface device comprises at least one sensing module. The sensing module is configured to detect a second transport usage condition determined (and selected, respectively) by a user interface of the interface device and linkable to the detected medium identifier. The interface device comprises at least one linking module. The linking module is configured to (temporarily) link a detected electronic medium identifier with the determined second transport usage condition. The interface device comprises at least one generation module. The generation module is configured to generate a change data set containing the detected electronic medium identifier, the second transport usage condition linked to the detected electronic medium identifier, and at least one first time date. The interface device comprises at least one transmitting module. The transmitting module is configured to transmit the generated change data set to a backend system of the passenger transport system, in particular to a previously described backend system.

As has been described, the detection module may be or comprise an (contactless or contact-based) interface configured to read the electronic medium identifier from a ticket medium held (respectively tapped) on or in the interface. It shall be understood that an interface device may include two or more different detection modules.

By means of a user interface, a user can in particular determine a second transport usage condition, in particular select from a plurality of selectable second transport usage conditions. Preferably, the user interface may comprise a touch display. In variants of the application, other user interfaces may also be provided, such as at least one button, a keyboard, etc. The actuation of the user interface, and thus in particular a determination of the second transport usage condition, is detectable by a sensing module. The detecting of the electronic medium identifier by the detection module is performed in particular after a detection of a specific second transport usage condition.

The determined second transport usage condition and the electronic medium identifier detected (immediately thereafter (e.g., within 0.1 s to 20 s)) are linked together by a linking module and an assignment module, respectively. Then, a (previously described) change data set may be generated and transmitted (in a previously described manner) to a (previously described) backend system.

According to a preferred embodiment of the interface device according to the application, the interface device may be a validator device. A validator device of a passenger transport system is configured to validate a ticket medium by detecting the electronic medium identifier stored in a storage means of the ticket medium. In particular, in a passenger transport system it is necessary for an authorized use of a transport vehicle that the ticket medium is validated before a corresponding use, i.e., that the electronic medium identifier is detected. In particular, the at least one validator device may be arranged in a stop area and/or a transport vehicle to enable a validating of the ticket medium upon entering the stop area and/or the transport vehicle (i.e., the area requiring payment).

As will be described, a detected electronic medium identifier may be stored and used for a ticket medium inspection by an inspection device to verify whether or not the ticket medium was validated prior to the transport trip.

Preferably, in the case of a validator device, the change data set can be a check-in data set and/or be integrated in a check-in data set. In a particularly user-friendly manner, the scope of validity of a (single) detected electronic medium identifier can be (temporarily) adjusted.

According to a further embodiment of the interface device according to the application, the interface device may comprise a checking module. The checking module may be configured to check an admissibility of the detected electronic medium identifier based on a comparison of the detected electronic medium identifier with a plurality of electronic medium identifiers stored in a negative list. In particular, the electronic medium identifiers that are not (or no longer) authorized to use a transport vehicle of the passenger transport system may be stored in a negative list.

The comparing may be performed by the checking module or by a further checking module of the backend system or a further computing device. The negative list may be stored in a local data memory of the interface device (preferably of each interface device). Then, the checking module may compare a detected electronic medium identifier with the at least one electronic medium identifier stored in the negative list. Alternatively or additionally, the negative list may be stored in a data memory of the backend system (or a further computing device). Then, the checking module may send the electronic medium identifier as a check request to the backend system (or to the further computing device). In response to the check request, the checking module of the interface device may receive the comparison result.

The interface device may comprise a release module. The release module may be configured to release a passing through the interface device if the detected electronic medium identifier is a permissible electronic medium identifier. In particular, an electronic medium identifier is permissible if it is determined in the comparison that the received electronic medium identifier does not correspond to any electronic medium identifiers stored in the negative list, in particular is not identical to any.

The release module can be configured to block a passing through the interface device if the detected electronic medium identifier is a non-permissible electronic medium identifier. In particular, an electronic medium identifier is non-permissible if it is determined in the comparison that the received electronic medium identifier corresponds to an electronic medium identifier stored in the negative list, in particular is identical to one.

Releasing the passage of a validator device can in particular be a (visual and/or audible) displaying of a release information. A blocking of passing a validator device can in particular be a (visual and/or audible) displaying of a blocking information. As will be described later, in the case of a passage barrier in which a previously described validator device can be integrated, passing can be blocked and released by means of a blocking element.

In particular, the risk of an unauthorized use of a transport vehicle can be reduced.

It shall be understood that alternatively or additionally a comparison with a positive list can be made.

According to a further embodiment of the interface device according to the application, the interface device may comprise a receiving module. The receiving module may be configured to receive a (previously described) change data set from a further interface device of the passenger transport system and/or from the backend system. The interface device, in particular a validator device, may comprise a (local) data memory configured to store the received change data set.

The interface device may comprise a checking module. The checking module may be configured to check the admissibility of the detected electronic medium identifier based on a comparison of the detected electronic medium identifier with the electronic medium identifier of the stored change data set. The checking module may compare a detected electronic medium identifier to the at least one electronic medium identifier stored in the data memory.

The interface device may comprise a release module. The release module may be configured to release a passing of the interface device if the detected electronic medium identifier corresponds (in particular is identical) to the stored electronic medium identifier.

The release module can be configured to block a passing of the interface device if the detected electronic medium identifier does not correspond (in particular, is not identical) to the stored electronic medium identifier.

Releasing the passage through a validator device can in particular be a (visual and/or audible) display of a release information. A blocking of a passing through a validator device can in particular be a (visual and/or audible) display of a blocking information. As will be described later, a passage barrier, in which a previously described validator device can be integrated, can block and release a passing by means of a blocking element.

The risk of an unauthorized use of a transport vehicle can be reduced even further.

As will be described in more detail, in a further embodiment of the interface device according to the application, the interface device, in particular in the form of a validator device, may be integrated in a passage barrier.

As already described, the interface device may comprise a data memory. According to a further embodiment, the data memory may be configured to (locally) store the change data set and/or a check-in data set. Preferably, the data memory may be configured to provide the change data set and/or a check-in data set such that the at least one stored change data set and/or the at least one check-in data set is/are receivable by an inspection device via a data network. In particular, all stored data sets can be receivable by an inspection device via the data network.

Preferably, the interface device, in particular in the form of a validator device, may comprise a first near field interface. The near field interface may be configured to receive at least one inspection identifier stored in an inspection element (which may, for example, be integrated in an inspection device). The validator device may comprise at least one authentication module configured to verify the authenticity of the received inspection identifier. The validator device may comprise at least one key module configured to provide a communication data set enabling access to a data network upon a positive authentication result such that the communication data set is receivable by the inspection element.

An inspection identifier is in particular a unique identifier, for example a character code, which is uniquely assigned to the inspection element and/or the inspector. Preferably, the inspection identifier can be irreversibly stored in a first memory unit of the inspection element.

The first near field interface can be an NFC (Near field Communication) interface. Alternatively to an NFC interface, an infrared interface, Bluetooth interface, WLAN interface, etc. can also be provided as the first near field interface. Further alternatively, the first near field interface may be a wired data interface used to operate a data dialog between the inspection device and the validator device. Such a wired data interface may, for example, be implemented as a USB, RS232, RS485 interface, wired LAN, or a proprietary developed wired data interface.

After receiving the inspection identifier, an authentication check can be performed. Preferably, a positive list of inspection identifiers can be stored in a data memory of the validator device. An authentication module, in particular in the form of a comparison module, can check the authenticity of the received inspection identifier by comparing it with the stored inspection identifiers. In this case, a positive authentication result is present if a stored inspection identifier corresponds to the received inspection identifier is detected. Otherwise, the authentication result is negative.

In particular, a key module provides a communication data set only in the event of a positive authentication result. The communication data set comprises information for a (secured) access to a data network, such as a Bluetooth network or a WLAN network. For example, the passenger transport system, in particular the interface device (but also a separate communication device of the passenger transport system) can have a further interface. In particular, the communication data set may comprise data required for establishing a near field communication link with the further near field interface. Preferably, the further near field interface may be a near field interface that provides a higher data transmission rate, in particular compared to a first near field interface, such as an NFC interface. Preferably, the further near field interface is a WLAN interface. Alternatively, the second near field interface can also be another interface, such as a Bluetooth interface.

The communication data set is provided by the key module in such a way that it can be received by the inspection element, in particular via the first near field interface and/or a further interface of the interface device.

Alternatively or additionally, the interface device may have a further interface. For example, a further near field interface or a display can be provided as a further interface. Thus, the communication data set can be shown on a display in the form of a QR (Quick Response) code.

Furthermore, in order to easily distinguish a received inspection identifier from another identifier, a corresponding information can be transmitted together with the inspection identifier and/or the inspection identifier itself can comprise a corresponding information.

A change and/or check-in data set to be transmitted can comprise at least one piece of information corresponding to the electronic medium identifier and/or the electronic medium identifier itself and, if present, the second transport usage condition linked thereto. Then, in an inspection process, the respective electronic medium identifiers of the respective ticket media of the users of a transport vehicle can be read and compared with the electronic medium identifiers received via the data network. Preferably, all change and/or check-in data sets can be transmitted in the form of a medium identifier list using the data network.

According to an embodiment, the communication data set may comprise at least one data network identifier of the data network. For example, the data network identifier may be a data network ID (identifier) and/or interface ID of the further interface and/or an interface address of the further interface of the validator device. In a preferred WLAN (wireless local area network) data network, the communication data set may comprise a static service set identifier (SSID). In order to increase security, a partially randomized SSID or a randomized SSID may be used instead of the static SSID. Particularly preferably, the communication data set further comprises at least one cryptographic key. The key may be a password, in particular a randomly generated password (e.g., WLAN password, Bluetooth password). This can further increase the communication security for the further communication connection.

In principle, the data network, in particular the further interface of the validator device, can be deactivated during normal operation for security reasons. In order to use the data network for the transmission, the interface device can comprise an activation module configured to activate the data network (for a predetermined period of time), such as the further interface, after a positive authentication result. The predetermined period of time may be between 2 min and 15 min, in particular between 3 min and 10 min. Alternatively or additionally, it may be provided that after the transmission of the last current user data set, the data network, such as the further interface, is deactivated again automatically or on the basis of a corresponding message from the inspection device.

In the practice of an inspection process, the problem arises that a user who uses a transport vehicle without authorization still quickly holds his ticket medium to a validator device when he/she detects an inspector. In order to prevent this, the interface device may comprise at least one blocking module configured to block the detecting of electronic medium identifiers after a positive authentication result of the inspection identifier. Preferably immediately (at least $<10$ s, in particular at least $<2$ s) after the positive authentication result is generated, for example, a control module of an interface device can be triggered to block the detecting of further identifiers.

The blocking module can preferably be configured to also transmit a blocking message to at least one further, preferably all further, validator device(s) that are connected to the validator device of the blocking module. This causes a blocking at preferably all validator device(s) of a transport vehicle. After completion of the inspection process, reception can be effected again by the inspection device, for example via a (still) existing further near field connection (e.g. WLAN connection) or by a renewed reading of an inspection identifier (possibly with additional manual confirmation by an inspector). Also, the blocking can be removed at the next stop station. Preferably, it can be provided that the blocking module releases the reception of identifiers of user identification elements upon detection of an opening of a vehicle door. Subsequently, an inspection element can start the inspection process in the previously described manner by reading an inspection identifier and, for example, cause a new blocking.

A further aspect of the application is a passage barrier for a passenger transport system. The passage barrier comprises a previously described interface device, in particular a previously described interface device, particularly preferably a previously described validator device. The passage barrier comprises at least one blocking element movable between a blocking position and a release position. The passage barrier device comprises at least one control module configured to control the movement of the blocking element between the blocking position and the release position.

A passage barrier is in particular a gate to and/or from a controlled area. A passage barrier comprises as a blocking element, for example, at least one pivotable, retractable and/or telescopic door. Also, the passage barrier may be formed as a turnstile. In addition, there are passage barriers without structural blocking elements that indicate the permissibility or non-permissibility of passage exclusively optically and/or acoustically.

In the initial state, the passage barrier can usually be blocked. In particular, this means that the blocking element in the blocked position physically prevents a user from passing through the passage barrier. In other cases, the passage barrier may be open in the initial state and close only when a user without a valid access authorization attempts to pass through the gate.—Without limiting generality, it is assumed below that the gate is blocked in the initial state and is intended to open for the user to pass through upon positive verification of a user's access authorization.

A (local) control module of the passage barrier can control an actuator of the passage barrier for moving the blocking element from the blocking position to the release position and/or vice versa. The control module may, for example, be controlled by the previously described release module and/or comprise the release module. A releasing of a passing of an interface device by a release module comprises in particular a control, by the control module, of an actuator of the passage barrier such that the blocking element is moved from the blocking position to the release position. A blocking of passing an interface device by a release module comprises in particular a control, by the control module, of an actuator of the passage barrier such that the blocking element is moved from the release position to the blocking position or remains in the blocking position.

According to a preferred embodiment of the passage barrier according to the application, the control module may be configured to control the movement of the blocking element between the blocking position and the release position based on the (second) transport usage condition associated with the detected electronic medium identifier. In particular, it has been recognized according to the application that a second transport usage condition may have different requirements for a movement of the blocking element than a first transport usage condition may have. On the one hand, it is still necessary to ensure that no unauthorized users can pass through the passage barrier. On the other hand, for example, the normal opening time duration configured in particular for one (adult) user may not be sufficient to allow, for example, two or more users to pass (at least in a user-convenient manner) upon detection of only a single electronic medium identifier (which is associated with a corresponding second transport usage condition).

Preferably, the control module may be configured to hold the blocking element in the release position for a release time duration. The length of the release time duration may be based on the (in particular second) transport usage condition associated with the detected electronic medium identifier. For example, an extension time duration may be associated with the at least one second transport usage condition. When the second transport usage condition is detected, for example by a checking module or release module, a base release time duration may be extended by the extension time duration. For example, an assignment table may be stored in which an extension time duration is assigned to each second transport usage condition. The assignment table may be stored in the data memory of an interface device. A basic release time duration may be assigned to the first transport usage condition.

According to a preferred embodiment of the passage barrier according to the application, the passage barrier may comprise at least one sensor (e.g., light barrier or the like). The at least one sensor may be configured to detect passages of the passage barrier in a release position of the barrier element. In particular, the sensor can count the passages respectively the corresponding number of users that pass through the passage barrier in a release position of the blocking element (i.e., before the barrier element is moved again into the blocking position).

The transport usage condition can define a specific number $n_N$ of users (respectively transport trips by a corresponding number of users) as the scope of validity of a single electronic medium identifier detected by the interface device (i.e., in particular a single tap). The control module may be configured to move the blocking element from the release position to the blocking position (only) upon detection of a number np of passages corresponding to the determined number $n_N$ of users. For example, if the number $n_N=4$, then the blocking element can remain in the release position, under control of the control module, until the sensor has detected a number $n_P=4$.

In order to further reduce the risk of an unauthorized person passing through the passage barrier, it is proposed according to a further embodiment of the passage barrier according to the application that the passage barrier can comprise at least one timer that can be started after each detected passage. The control module may be configured to move the blocking element from the release position to the blocking position when the timer expires, in particular even if the detected number $n_P$ of passages has not yet reached the number $n_N$ of users. A period of between 5 and 30 seconds can be set as the duration of the timer, preferably between 10 and 15 seconds.

A still further subject matter of the application is a passenger transport system. The passenger transport system comprises at least one previously described backend system. The passenger transport system comprises at least one interface device, in particular a previously described interface device, in particular preferably a previously described passage barrier. The interface device is at least configured to detect an electronic medium identifier of a ticket medium and/or a user identifier for identifying a stored user data set. The interface device is at least configured to detect a transport usage condition determined by means of a user interface of the interface device. The interface device is at least configured to generate a change data set comprising at least the detected electronic medium identifier and/or user identifier, the determined transport usage condition and at least one first time date. The interface device is at least configured to transmit the generated change data set to the backend system.

The passenger transport system according to the application may further comprise at least one transport vehicle and/or a stop area. In addition, the passenger transport system may preferably comprise a plurality of interface devices. For example, a plurality of validator devices and/or a plurality of passage barriers may be provided. Alternatively or additionally, the at least one interface device may be a ticket vending machine and/or a mobile terminal of a user.

For example, a computer application (also referred to as an app) may be stored on the mobile terminal in the form of a transport application. Exemplary and non-exhaustive mobile end devices in this context are smartphones, tablet computers, mobile game consoles, laptops, netbooks, data glasses, smart watches and similar wearables.

In addition, the passenger transport system may comprise at least one ticket medium (described above).

A still further aspect is a (computer-implemented) method for operating a (in particular previously described) passenger transport system with a backend system, in particular a previously described backend system. The method comprises:

- storing at least one user data set containing at least one electronic medium identifier authorizing the execution of a transport trip (with a passenger transport vehicle of the passenger transport system) and at least one first transport usage condition linked to the electronic medium identifier,
- receiving a change data set generated by an interface device of the passenger transport system, the change data set containing at least one second transport usage condition, at least one first time date, and at least one user identifier for identifying a stored user data set; and
- changing the linkage between the electronic medium identifier stored in the identified user data set and the first transport usage condition for at least one future transport trip based on the received second transport usage condition,
- reconstructing an executed transport trip at least based on a check-in data set received from a validator device of the passenger transport system, the check-in data set containing at least the electronic medium identifier, and on a provided check-out data set containing at least the same electronic medium identifier, and
- generating a billing data set based at least on the reconstructed transport trip and a transport usage condition of the user data set associated with the electronic medium identifier (wherein the user data set is determinable based on the electronic medium identifier contained in the check-in data set and the check-out data set, respectively).

A module or device can be formed at least partially from software and/or at least partially from hardware. In particular, a device/module may comprise suitable computing elements (e.g., processor, memory, etc.) to execute software elements (or computer code). It should also be noted that terms such as "first"; "second" etc. do not indicate an order, but are used in particular to distinguish between two elements (e.g., transport usage condition, time date etc.).

The features of the backend systems, interface devices, passage barriers, passenger transport systems and methods can be freely combined with each other. In particular, features of the description and/or of the dependent claims may be independently inventive, even by completely or partially circumventing features of the independent claims, in sole position or freely combined with each other.

BRIEF DESCRIPTION OF THE DRAWINGS

There is now a multitude of possibilities for designing and further developing the backend system according to the application, the interface device according to the application, the passage barrier according to the application, the passenger transport system according to the application and the method according to the application. For this purpose, reference is made on the one hand to the claims subordinate to the independent claims, and on the other hand to the description of embodiments in connection with the drawings. The drawings show:

Similar elements are designated below with similar reference signs.

DETAILED DESCRIPTION OF SPECIFIC EMBODIMENTS

Figure 1:
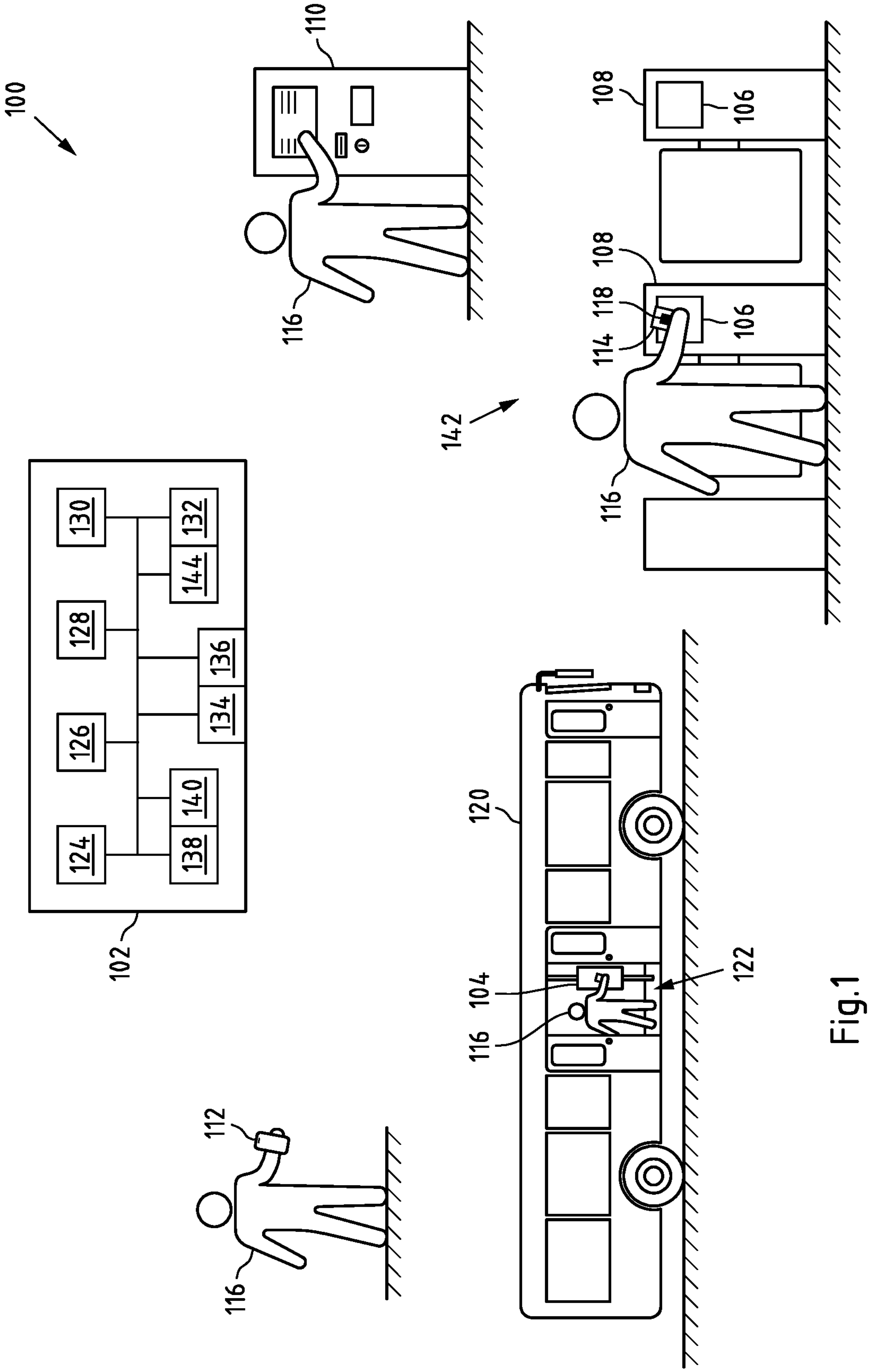
FIG. 1 a schematic view of an embodiment of a passenger transport system according to the present application with an embodiment of a backend system according to the present application, FIG. 2 a schematic view of an embodiment of an interface device in the form of a validator device according to the present application, FIG. 3 a schematic view of an embodiment of a passage barrier according to the present application, FIG. 4 a diagram of an embodiment of a method according to the present application, FIG. 5 a flowchart of a further embodiment of a method according to the present application, FIG. 6 a flowchart of a further embodiment of a method according to the present application, FIG. 7 a flowchart of a further embodiment of a method according to the present application, and FIG. 8 a flowchart of a further embodiment of a method according to the present application.

FIG. 1 shows a schematic view of an embodiment of a passenger transport system 100 according to the present application, with an embodiment of a backend system 102 according to the present application.

In addition to the at least one backend system 102, the passenger transport system 100 comprises at least one interface device 104, 106, 110, 112, preferably a plurality of interface devices 104, 106, 110, 112. Exemplarily, at least one validator device 104 and/or at least one interface device 106 (in particular also a validator device) arranged in a passage barrier 108 and/or at least one mobile terminal 112 (e.g., a smartphone) of a user 116 and/or at least one ticket vending machine 110 are arranged as interface device 104.

An interface device 104 may be arranged in a transport vehicle 120 (e.g., a bus, a train, etc.), in particular in an entrance area 122 and/or an exit area 122 of the transport vehicle 120. Preferably, the passenger transport system 100 may comprise the at least one transport vehicle 120. Alternatively or additionally, an interface device 106, 110 may be arranged in a stop area 142 of the passenger transport system 100.

Furthermore, the passenger transport system 100 may comprise at least one ticket medium 114, preferably a plurality of ticket media 114. A ticket medium 114 according to the present application may comprise at least one storage means 118. The storage means 118 is used to store the electronic medium identifier of the ticket medium 114. In particular, the electronic medium identifier is readable by means of a not shown (contactless and/or contact-based) interface of the ticket medium 114.

Preferably, the ticket medium may be a credit card-based and/or debit card-based ticket medium. Preferably, the ticket medium may be a credit card and/or a debit card. Also, the card-based ticket medium may be a mobile terminal on which a credit card and/or debit card is electronically mapped or to which a credit card and/or debit card is electronically (uniquely) linked. Non-exhaustive examples of such a concept are Apple Pay, Google Pay or PayPal.

An interface device 104, 106, 110, 112 of the passenger transport system 100 is at least configured to detect an electronic medium identifier of a ticket medium and/or a user identifier (of the user data set) for identifying a stored user data set (from the plurality of stored user data sets). In particular, an interface device 104, 106, 110, 112 may comprise at least one detection module, such as a (contactless) near-field interface (e.g., NFC interface, camera, Bluetooth interface, etc.) in particular for detecting the electronic medium identifier and/or a contact-based interface (e.g., magnetic stripe reader module, etc.), in particular for detecting the electronic medium identifier, and/or a user interface (e.g. keyboard, touch display, etc.), in particular for detecting a user identifier (e.g. user name and password, etc.) (which can be entered by means of the user interface).

The at least one interface device 104, 106, 110, 112 of the passenger transport system 100 is further at least configured to detect a transport usage condition determined by means of a user interface (e.g., keyboard, touch display, etc.) of the interface device 104, 106, 110, 112. In particular, the same user interface that has already been used to detect the user identifier may be used. A different user interface may also be used in variants of the application.

The at least one interface device 104, 106, 110, 112 of the passenger transport system 100 is further configured to at least generate a change data set. The change data set contains at least the detected electronic medium identifier and/or user identifier, the determined transport usage condition, and at least one first time date (in particular, the detection time (and time stamp, respectively) of the electronic medium identifier and/or user identifier or the transmitting time of the change data set).

The interface device 104, 106, 110, 112 of the passenger transport system 100 is further configured to transmit the generated change data set to the backend system 102.

The illustrated backend system 102 (in particular formed by at least one computing device and/or cloud system) comprises at least one data memory 124. The data memory 124 is at least configured to store at least one user data set and user account, respectively, preferably a plurality of user data sets of in particular a corresponding number of different users 116 of the passenger transport system 100. It shall be understood that further data may be stored in the at least one data memory 124.

The at least one stored user data set contains at least one electronic medium identifier authorizing the execution of a transport trip and at least one first transport usage condition linked to the electronic medium identifier. Optionally, further data may be stored, such as a further user identifier, billing data, etc., as has already been described.

In addition, the backend system comprises at least one receiving module 134 and optionally a transmitting module 136. In particular, at least one bidirectional communication module may be provided for transmitting and receiving data. It shall be understood that two or more communication modules may be provided for different communication technologies.

The at least one receiving module 134 is configured to receive, in particular via a (not shown) wireless and/or wired communication network, a change data set generated by an interface device 104, 106, 110, 112 of the passenger transport system 100. As previously described, a received change data set contains at least one second transport usage condition, at least one first time date, and at least one user identifier for identifying a stored user data set. The user identifier may be the electronic medium identifier and/or a further user identifier, such as a user name and/or user password.

In addition, the backend system 102 comprises at least one change module 126. The at least one change module 126 is configured to change the linkage between the electronic medium identifier stored in the user data set identified (by means of the user identifier of the received change data set) and the first transport usage condition for at least one future transport trip based on the received second transport usage condition.

In particular, the change module 126 replaces or supplements the linkage between the first transport usage condition and the electronic medium identifier with a linkage between this electronic medium identifier and the second transport usage condition that is different from the first transport usage condition (immediately) after receiving the change data set.

Replace means that for at least one future, i.e., the immediately following, transport trip only the linkage between the electronic medium identifier and the second transport usage condition is valid. Supplement means that for at least one future, i.e., the immediately following, transport trip both the linkage between the electronic medium identifier and the second transport usage condition and the linkage between the electronic medium identifier and the first transport usage condition are valid. It shall be understood that at least one further linkage between the electronic medium identifier and at least one further second transport usage condition may be valid.

The backend system 102 comprises at least one trip reconstruction module 128. The trip reconstruction module 128 is configured to reconstruct an executed transport trip at least based on a check-in data set (e.g., said change data set) received from a validator device of the passenger transport system, the check-in data set containing at least the electronic medium identifier, and a provided check-out data set containing at least the same electronic medium identifier. Further data, such as schedule data, transport vehicle movement data, etc., may be considered by the trip reconstruction module 128.

Furthermore, a generation module 130 is provided, which is configured to generate a billing data set at least based on the reconstructed transport trip and the transport usage condition of the user data set linked to the electronic medium identifier, i.e., for example, only a linkage between the electronic medium identifier and the second transport usage condition or the linkages between the electronic medium identifier and the first transport usage condition as well as the second transport usage condition.

Optionally, the backend system 102 may comprise further modules 132, 138, 140, and 144, such as a time module 138, a timer 140, a counting module 132, and a counter 144.

Optionally, the change data set may contain at least one second time date (e.g., t=2 h, t=24 h, t=48 h, etc.) indicating a validity time duration of the second transport usage condition. In particular, the time module 138 is configured to set the timer 140 according to the second time date, i.e., 2 h, 24 h, or 48 h in said example. The change module 126 may be configured to change the linkage between the electronic medium identifier stored in the identified user data set and the second transport usage condition upon detection of an expiration of the timer 140 based on the first transport usage condition. In particular, after the change, only the linkage between the electronic medium identifier and the first transport usage condition is again valid (until the next change data set for that electronic medium identifier is received).

Alternatively or additionally, a change data set may optionally contain at least one trip number (e.g., 10) indicating the number of trips (between a check-in and a check-out) for which the second transport usage condition is valid. In particular, the counting module 132 is configured to set the counter 144 according to the number of trips contained in the change data set.

The change module 126 may be configured to change the linkage between the electronic medium identifier stored in the identified user data set and the second transport usage condition upon detection of an expiration of the counter 144 based on the first transport usage condition. In particular, after the change, only the linkage between the electronic medium identifier and the first transport usage condition is again valid (until the next change data set for that electronic medium identifier is received). Thus, when the counter 144 in the above example reaches 10 (or has counted down from 10 to zero), the change module 126 may change the linkage as described.

Figure 2:
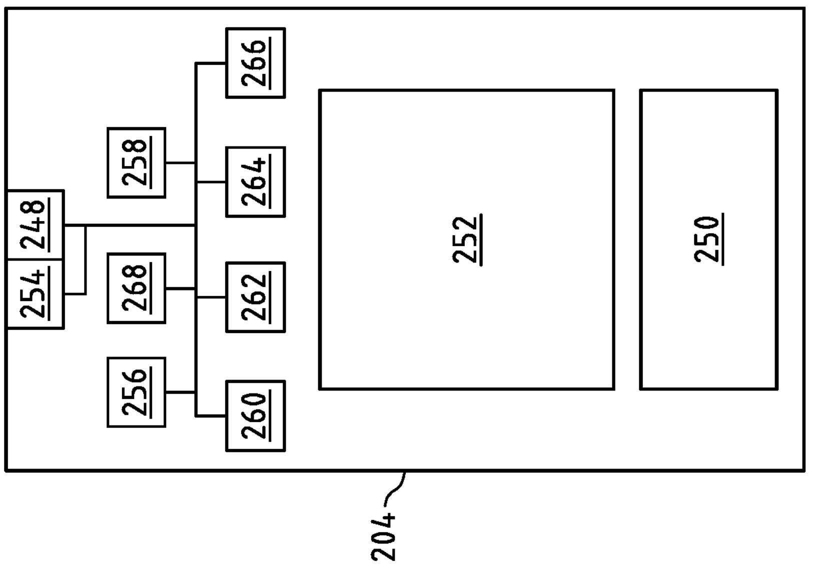

FIG. 2 shows a schematic view of an embodiment of an interface device 204, in particular in the form of a validator device 204, such as can be used, for example, in the passenger transport system 100 according to FIG. 1.

As previously described, the validator device 204 comprises at least one detection module 250 (e.g., a near-field interface 250) for detecting the electronic medium identifier of a ticket medium held within the read range of the detection module 250. By detecting the electronic medium identifier, for example, a validating of the ticket medium can be performed and a check-in data set can be generated.

The validator device 204 comprises at least one sensing module 256. In particular, the sensing module 256 is configured to detect a second transport usage condition determined by means of a user interface 252 (in the present example, a touch display 252) and linkable to the detected medium identifier. In particular, a selection of different and available second transport usage conditions can be displayed on the user interface 252, such as additional users, additional luggage, etc. At least one second transport usage condition may be selected respectively determined by (manually) selecting it via the touch display 252. This can be detected by the sensing module 256.

Furthermore, the validator device 204 comprises at least one linking module 258 that is configured to link a detected electronic medium identifier with the determined second transport usage condition. Linking is performed in particular by linking (immediately (e.g.: between 1 s and 20 s)) after a selecting respectively determining of the at least one second transport usage condition by means of the user interface 252 by the detection module 250, this detected electronic medium identifier with the determined second transport usage condition by the linking module 258.

Further, at least one generation module 260 is provided. The generation module 260 is configured to generate the change data set containing the detected electronic medium identifier, the second transport usage condition associated with the detected electronic medium identifier, and at least one first time date. In particular, this change data set is a check-in data set.

The at least one transmitting module 254 of the validator device 204 is configured to transmit the generated change data set to a backend system (e.g., 102) of the passenger transport system.

Optionally, a validator device 204 may comprise at least one further module 248, 262, 264, 266, 268. In particular, the validator device 204 may comprise at least one receiving module 248 in addition to a transmitting module 254. In particular, at least one bidirectional (remote) communication module for transmitting and receiving data can be provided. It shall be understood that two or more communication modules may be provided for different communication technologies.

In addition, the interface device 204 may optionally include a checking module 262 and a release module 264. The checking module 262 is configured to check an admissibility of a respective detected electronic medium identifier based on a comparison (performed by the checking module 262 or a checking module (not shown) of the backend system) of the detected electronic medium identifier with a plurality of electronic medium identifiers stored in a negative list, as previously described.

The release module 264 may be configured to release a passing through the interface device 204 if the detected electronic medium identifier is a permissible electronic medium identifier. A releasing may be indicated, for example, by the user interface 252.

The release module 264 may be configured to block a passing of the interface device if the detected electronic medium identifier is a non-permissible electronic medium identifier. A blocking may be indicated, for example, by the user interface 252.

Alternatively or additionally, a validator device 204 may preferably have a (local) data memory 266. The data memory 266 may be configured to store received change data sets of at least one further (not shown) validator device and, in particular, the generated change data sets.

The authentication module 262 may alternatively or additionally be configured to verify the authenticity of the detected electronic medium identifier based on a comparing of the detected electronic medium identifier with the electronic medium identifier of the at least one stored change data set.

The release module may alternatively or additionally be configured to release a passing of the interface device 204 if the detected electronic medium identifier corresponds to the at least one stored electronic medium identifier. This may be indicated, for example, by the user interface 252.

The release module 264 may be configured to block a passing through the interface device if the detected electronic medium identifier does not correspond to the at least one stored electronic medium identifier. This may be indicated, for example, by the user interface 252.

As previously described, the data memory 266 may be configured to store the generated and/or received change data sets. Additionally, in particular, the at least one check-in data set may be stored in the data memory 266. The data memory 266 may be configured to provide, for example via a further interface 268, the at least one change data set and/or the at least one check-in data set such that said data sets are receivable by an (not shown) inspection device via a (not shown) data network.

As has been described above, the inspection device can read all electronic media identifiers that have been detected (and, in particular, that have not yet been deemed to have been cancelled or checked out) and store them locally in the inspection device. In other words, all medium identifiers of properly validated ticket media can be transmitted to the inspection device by the validator device 204. Then, all (current) users of the transport vehicle can be verified by having their respective ticket media read by the inspection device, i.e., having their respective electronic medium identifiers detected by the inspection device, and compared to the locally stored (permissible) electronic medium identifiers. If it is determined that there is no correspondence between a detected medium identifier and a medium identifier stored locally in the inspection device, it can be assumed that the user is not authorized to use the transport vehicle. By additionally reading second transport usage conditions from the validator device 204 by the inspection device, the authorization of additional users and/or items can also be verified in a simple manner (by an inspector).

Figure 3:
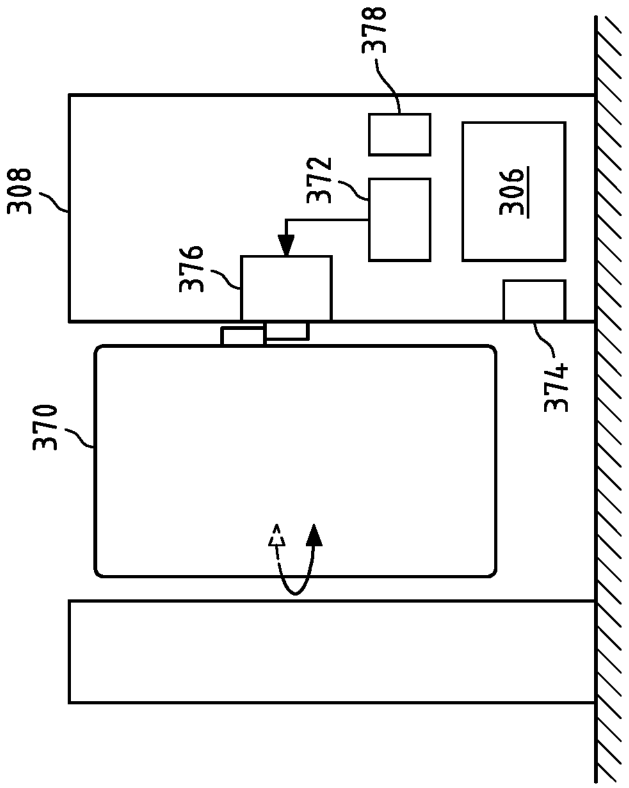

FIG. 3 shows a schematic view of an embodiment of a passage barrier 308 according to the present application, in particular with an interface device 306. The interface device 306 may preferably be formed according to the interface device 204 of FIG. 2.

The passage barrier 308 comprises a movable blocking element 370 (in particular a door 370). In the present case, the blocking element 370 can be moved respectively displaced between a release position and a blocking position shown in FIG. 3 by an actuator 376, which can be arranged in a base of the passage barrier 308.

In particular, the passage barrier 308 may comprise a local control module 372, in particular configured to control the actuator 376. In particular, the control module 372 may be configured to control a moving of the blocking element (in particular by controlling the actuator 376) between the blocking position and the release position. For example, a release module of the interface device 306 may be linked to the control module 372. As has been described, the release module may cause a releasing and blocking of passing through the passage barrier 308. Depending on the input from the release module, a moving of the blocking element 370 may be caused respectively controlled (or refrained from) by the control module 372.

Preferably, the controlling is based on the (first and/or second) transport usage condition(s) linked with the detected electronic medium identifier. In particular, the control module 372 may be configured to hold the blocking element 370 in the release position for a release time duration. The length of the release time duration may be based on the (second) transport usage condition linked with the detected electronic medium identifier. In particular, the first transport usage condition may provide a default release time duration that may be extended based on the second transport usage condition.

Optionally, the passage barrier 308 may comprise at least one sensor 374, such as in the form of a light barrier. The sensor 374 may be configured to detect passages through the passage barrier 308 in the release position of the barrier element 370. In particular, a second transport usage condition may specify a specific number $n_N$ of users as the scope of validity of a single electronic medium identifier detected by the interface device 306 (for the first transport usage condition, there may be (by default) $n_N=1$).

The control module 372 may be configured to move the blocking element 370 from the release position to the blocking position upon respectively (immediately) after a detection of a number $n_P$ of passages corresponding to the determined number $n_N$ of users, as described earlier.

In particular, in addition, the passage barrier 308 may comprise at least one timer 378 that can be started after each detected passage. The control module 372 may be configured to move the blocking element 370 from the release position to the blocking position (always) upon expiration of the timer 378.

Figure 4:
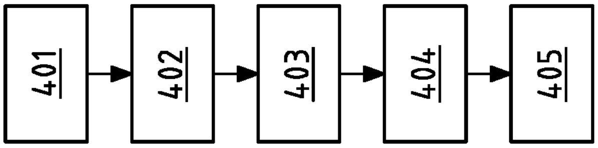

FIG. 4 shows an embodiment of a method according to the present application for operating a backend system (e.g., the backend system 102 according to FIG. 1) of a passenger transport system.

In a step 401, a storing of at least one user data set is performed, the user data set containing at least one electronic medium identifier authorizing to execute a transport trip (with a passenger transport vehicle) and at least one first transport usage condition linked with the electronic medium identifier, as has been described.

In step 402, a receiving of a change data set generated by an interface device of the passenger transport system is performed, the change data set containing at least one second transport usage condition, at least one first time date, and at least one user identifier for identifying a stored user data set, as has been described.

In step 403, changing the linkage between the electronic medium identifier stored in the identified user data set and the first transport usage condition is performed for at least one future transport trip is performed based on the received second transport usage condition, as has been described.

In step 404, a reconstructing of an executed transport trip is performed at least based on a check-in data set received from a validator device of the passenger transport system containing at least the electronic medium identifier, and a provided check-out data set containing at least the electronic medium identifier, as has been described.

In step 405, a generating of a billing data set is performed based at least on the reconstructed transport trip and the transport usage condition of the user data set linked with the electronic medium identifier. Then, the billing data set may be transmitted to the user, for example, as has been described.

FIGS. 5 to 8 show exemplary use cases and methods, respectively.

Figure 5:
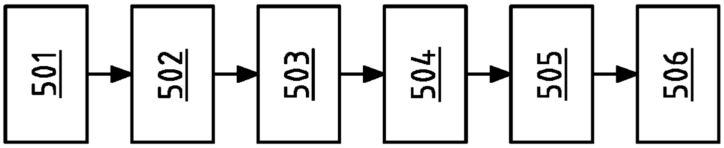

In the application according to FIG. 5, at least one validator device (e.g., as in FIG. 2) can be arranged in a transport vehicle (e.g., bus, streetcar, subway, commuter train, ferry, . . . ), which in particular is intended to be used immediately after a user enters the vehicle.

Alternatively or additionally, at least one validator device (e.g., as in FIG. 2) can be arranged in a stop area respectively at a stop (e.g., station concourse, platform, stop), which is intended to be used in particular before a user enters the vehicle respectively enters the boarding area. In this case, for example, a group of users may wish to use the transport vehicle.

In a first step 501, one of the users of the group can determine respectively select a second transport usage condition by means of a user interface of the validator device, in particular to select the scope of validity for the next "tap" with his ticket medium. For example, the following second transport usage condition can be determined respectively selected on a touch display with plus/minus keys:

+ ADULT –
+ CHILD –
+ BICYCLE –
+ DOG –

The determined second transport usage condition may be detected by a sensing module.

In a step 502 immediately following step 501, the user can then cause a check-in for the entire group at the validator device by a single tap, i.e., by detecting the electronic medium identifier of his ticket medium.

In step 503, the detected second transport usage condition is linked to the detected electronic medium identifier. In particular, the validator device can generate and store a single change data set respectively validation data set which, compared to a conventional check-in data set, can in particular contain additional data about the currently selected scope of validity. In a step 504, this data set can be transmitted to the backend system.

Then the group can drive to its destination. If a check-out is necessary, the entire group can be checked out with a single tap and, in particular, a corresponding check-out data set can be generated and transmitted. In this exemplary use case, if the same group in identical occupancy wishes to continue the trip, the same second transport usage condition must be selected again at the next check-in before the "tap". If the group wants to continue the trip with a different occupation, a different second transport usage condition must be selected at the next check-in before the "tap" in this exemplary use case.

The backend system reconstructs according to the received data sets in step 505 the at least one performed transport trip and charges this at least one trip, in particular according to the second transport usage condition, with the payment means deposited to the customer account assigned to the used electronic medium identifier (step 506).

The backend system can optionally transmit at least one message about the selected second transport usage condition, for example to a mobile device respectively app on the user's mobile device, to a mobile phone number stored in the customer account, and/or to an email address stored for the customer account.

Figure 6:
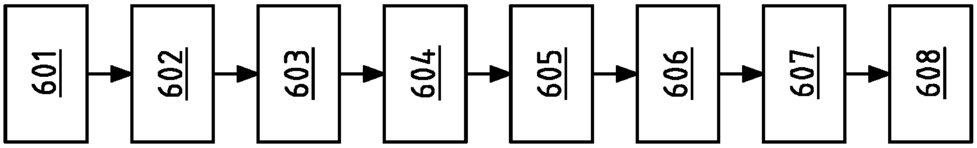

In the use case according to FIG. 6, at least one validator device (e.g., as in FIG. 2) can be arranged in a transport vehicle (e.g., bus, streetcar, subway, commuter train, ferry, . . . ), which in particular is intended to be used immediately after a user enters the vehicle. Alternatively or additionally, at least one validator device (e.g. as in FIG. 2) can be arranged in a stop area respectively at a stop (e.g. station concourse, platform, stop), which is intended to be used in particular before a user enters the vehicle respectively before a user enters the boarding area. In this case, for example, a group of users may wish to use the transport vehicle.

One of the users of the group in the present case uses a further interface device of the passenger transport system in a first step 601 for determining a second transport usage condition to pre-select the scope of validity for the next "tap" with its ticket medium. The further interface device of the passenger transport system may be, for example:

- a special validator device with a customized "preset" application,
- a ticket vending machine with an additional function,
- a website that can be accessed via a mobile device, for example,
- an app installed on the mobile device.

The user can use his ticket medium respectively the electronic medium identifier stored therein for the identification of his user account or a further user identifier (e.g., the user can enter access data for a user account). Then, in a step 602, the user can determine respectively select a second transport usage condition by means of a user interface of the further interface device, in particular in order to select the scope of validity for the next "tap" with his ticket medium. For example, the following second transport usage condition can be determined at a touch display with plus/minus keys:

+ ADULT –
+ CHILD –
+ BICYCLE –
+ DOG –

The determined second transport usage condition may be detected by a sensing module.

In step 603, a change data set may be transmitted to the backend system. The backend system may store the change data set and, in particular, in step 604, change the linkage between the electronic medium identifier stored in the identified user data set and the first transport usage condition for at least one future transport trip based on the received second transport usage condition.

Then, at a validator device, the user can perform a check-in for the entire group with a single "tap" of his/her ticket medium.

In step 605, the validator device can generate and, for example, store a check-in data set. In particular, the check-in data set does not contain any additional data about the currently selected scope of validity. In step 606, the check-in data set can be transmitted to the backend system.

The backend system may store the check-in data set and link it to the stored second transport usage condition. Optionally, the backend system can transmit a change data set containing the second transport usage condition to the at least one validator device. Then, the validator device may display the selected second transport usage condition immediately after the electronic medium identifier is detected. The validator device may store said data sets, in particular for an inspection process described previously.

The backend system reconstructs, according to the received data sets in step 607, the at least one completed trip and charges this at least one trip, in particular according to the second transport usage condition, to the payment means stored to the customer account assigned to the used electronic medium identifier (step 608).

The backend system can optionally transmit at least one message about the selected second transport usage condition, for example to a mobile device respectively app on the user's mobile device, to a mobile phone number stored in the customer account, and/or to an email address stored for the customer account.

Figure 7:
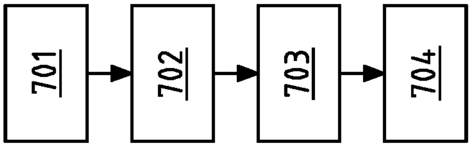

In the use case according to FIG. 7, at least one passage barrier (e.g., as in FIG. 3) and/or at least one passage barrier array with a plurality of passage barriers (e.g., as in FIG. 3) may be arranged in a stop area respectively at a stop point (e.g., station concourse, platform, stop), wherein the passage barrier is intended to be used before a transport vehicle is entered and/or before the boarding area is entered. Again, by way of example, a group of users may wish to use the at least one transport vehicle.

In a first step 701, one of the users can determine respectively select a second transport usage condition by means of a user interface of the interface device (e.g., a validator device) of the transit barrier, in particular, in order to select the scope of validity for the next "tap" with his/her ticket medium. For example, the following second transport usage condition can be determined at a touch display with plus/minus keys:

+ ADULT –
+ CHILD –
+ BICYCLE –
+ DOG –

The determined second transport usage condition may be detected by a sensing module.

In a step 702 immediately following step 701, the user can then cause a check-in for the entire group at the validator device by a single tap, i.e., by detecting the electronic medium identifier of his/her ticket medium.

In step 703, the detected second transport usage condition is linked to the detected electronic medium identifier. In particular, the interface device can generate and store a single change data set and validation data set, respectively, which, compared to a conventional check-in data set, can in particular contain additional data about the currently selected scope of validity.

The passage barrier then releases its access for the number $n_N$ of preselected passengers. In particular, the at least one barrier element is opened and $n_P$ passages are allowed, detectable by at least one sensor of the passage barrier. In particular, it may be provided that as long as less than $n_P$ passages are detected by the at least one sensor, a timer of the passage barrier is started after each passage (e.g., 10 to 15 seconds). If the next passage does not start within the expiration of the timer, the blocking element is moved to the blocking position. After detecting $n_P$ passages, the blocking element can be moved to the blocking position. Alternatively or additionally, an in particular slow closing of the at least one blocking element can be performed, e.g. depending on the selected additional persons or objects (e.g., if children or dogs have been preselected).

In a step 704, the data set generated in step 703 can be transmitted to the backend system. Then, according to step 505 of FIG. 5, the method can be continued.

Figure 8:
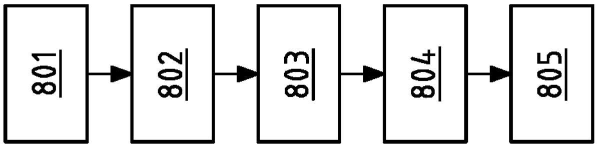

In the use case according to FIG. 8, at least one passage barrier (e.g., as in FIG. 3) and/or at least one passage barrier array with a plurality of passage barriers (e.g., as in FIG. 3) can be arranged in a stop area respectively at a stop point (e.g., station concourse, platform, stop), wherein the passage barrier is intended to be used before a transport vehicle is entered and/or before the boarding area is entered. Again, by way of example, a group of users may wish to use the at least one transport vehicle.

As in FIG. 6, one of the users may use a further interface device in step 801 for determining a second transport usage condition to pre-select the scope of validity for the next "tap" with its ticket medium.

As in FIG. 6, the further interface device can transmit the change data set for the next "tap" with the corresponding ticket medium identifier to the backend system (step 802).

Furthermore, according to FIG. 6, the backend system can link the change data set for the next tap to the medium identifier and, in particular, store it. Then the change data set can be transmitted and stored by the backend system in the way described before (step 803).

The backend system may transmit the received change data set to preferably all transit barriers (this is done in particular within a few seconds (e.g., <3 seconds) after a reception) (step 804).

The user can then perform a check-in for the entire group at the passage barrier in step 805 with a single "tap" of his/her ticket medium. Then, according to FIG. 7, the passage barrier can release the passage barrier, and the method can continue according to FIG. 7.

As already described, an inspection process can optionally be carried out according to the application. In order to carry out an inspection, in particular of open-payment ticket media described above (i.e., to check whether each passenger has tapped respectively validated his or her ticket medium at a validator device before entering the transport vehicle), an inspector can tap an inspection card (also referred to as an inspection element) at a validator device and can cause a validator device in a transport vehicle, in particular by means of a (secured) data network in the form of a (secured) WLAN, to transmit the current medium identifier list of the validated ticket media to an inspection device of the inspector.

In a subsequent inspection process, the inspection device may detect and read, respectively, an electronic medium identifier of a user's ticket medium to be inspected to verify that the read electronic medium identifier is on the current medium identifier list, as previously described.

For example, according to the first use case, the current medium identifier list of a validator device may also contain the additional data respectively the second transport usage conditions about the currently selected scope of validity of a ticket medium used, i.e., in particular: How many people and items requiring payment are riding on a tap. The inspection device can take this information from the medium identifier list and display it to the inspector, for example.

According to the use case shown in FIG. 6, the current medium identifier list of a validator device cannot contain the additional data on the currently selected scope of validity of a ticket medium used, i.e., in particular, it cannot contain information on the fact that several persons and objects requiring payment are riding on one tap. This information can be requested by the inspection device for a current inspection process by means of a remote communication network at the backend system.

Finally, it should be noted that multiple tapping is not a preferred solution for a majority of users in practice, as it violates the frequently applicable anti-passback rules, does not allow other tariffs to be activated (child tariff, etc.) and, in particular, leads to operating errors, as it is not always clear to the user how many times he has actually "tapped" contactless.

LIST OF REFERENCE SIGNS

100 passenger transport system
102 backend system
104 interface device, in particular validator device,
106 interface device
108 passage barrier
110 interface device, in particular ticket vending machine
112 interface device, in particular mobile terminal device
114 ticket medium
116 user
118 storage means
120 transport vehicle
122 exit area or entrance area
124 data memory
126 change module
128 trip reconstruction module
130 generation module
132 counting module
134 receiving module
136 transmitting module
138 time module

140 timer
142 stop area
144 counter
204 interface device, in particular validator device
248 receiving module
250 detection module
252 user interface, in particular touch display
254 transmitting module
256 sensing module
258 linking module
260 generation module
262 checking module
264 release module
266 data memory
268 interface
306 interface device
308 passage barrier
370 blocking element
372 control module
374 sensor
376 actuator
378 timer

What is claimed is:

1. An interface device in form of a validator device for a passenger transport system with open ticket media, wherein the interface device is arrangeable in a passenger transport vehicle and/or in a transport stop area, comprising:

at least one detection module configured to detect an electronic medium identifier of a ticket medium, wherein the electronic medium identifier is an electronic medium identifier authorizing the execution of a transport trip and linked to a first transport usage condition, at least one sensing module configured to detect a second transport usage condition determined by means of a user interface of the interface device and linkable to the detected medium identifier, at least one linking module configured to link a detected electronic medium identifier to the determined second transport usage condition, wherein the second transport usage condition is a further transport usage condition different in scope of validity from or additional in scope of validity to the first transport usage condition, wherein in the second transport usage condition at least one of the following is defined: a plurality of transport trips for a plurality of full-paying users, at least one additional transport trip for a non-full-paying user, and a transport trip for a user with an additional luggage, at least one generation module configured to generate a change data set containing the detected electronic medium identifier, the second transport usage condition linked with the detected electronic medium identifier, and at least one first time date wherein the change data set is included in a check-in data set and/or forms the check-in data set, and at least one transmitting module configured to transmit the generated change data set to a backend system of the passenger transport system.

2. A passenger transport system with open ticket media comprising:

at least one data memory configured to store at least one user data set, containing at least one electronic medium identifier authorizing the execution of a transport trip and at least one first transport usage condition linked to the electronic medium identifier, at least one receiving module configured to receive a change data set generated by an interface device of the passenger transport system, the change data set containing at least one second transport usage condition, at least one first time date, and at least one user identifier for identifying a stored user data set, at least one change module configured to change the linkage between the electronic medium identifier stored in the identified user data set and the first transport usage condition for at least one future transport trip based on the received second transport usage condition, at least one trip reconstruction module configured to reconstruct an executed transport trip based at least on a check-in data set received from a validator device of the passenger transport system containing at least one electronic medium identifier and a provided check-out data set containing at least the same electronic medium identifier, at least one generation module configured to generate a billing data set at least based on the reconstructed transport trip and the transport usage condition of the user data set linked to the electronic medium identifier, and at least one interface device according to claim 1.

3. The system according to claim 2, wherein the change data set contains at least one second time date indicating a validity time duration of the second transport usage condition, wherein the backend system comprises at least one time module configured to set a timer according to the second time date, and wherein the change module is configured to change the linkage between the electronic medium identifier stored in the identified user data set and the second transport usage condition upon detection of an expiration of the timer based on the first transport usage condition.

4. The system according to claim 2, wherein the change data set contains at least one trip number indicating the number of trips for which the second transport usage condition is valid, wherein the backend system comprises at least one counter module configured to set a counter corresponding to the number of trips, and wherein the change module is configured to change the linkage between the electronic medium identifier stored in the identified user data set and the second transport usage condition upon detection of an expiration of the counter based on the first transport usage condition.

5. The system according to claim 2, wherein the backend system comprises a transmitting module configured to transmit a received change data set to at least one further interface device of the passenger transport system after a change of the linkage.

6. The interface device according to claim 1, wherein the interface device comprises a data memory configured to store the change data set and/or a check-in data set, wherein the data memory is configured to provide the change data set and/or a check-in data set such that the change data set and/or a check-in data set is receivable by an inspection device via a data network.

7. The system according to claim 2, wherein the backend system comprises a transmitting module configured to transmit a change message about the at least one second transport usage condition to the interface device after a change of the linkage, and/or the backend system comprises a transmitting module configured to transmit a change message about the at least one second transport usage condition to a communication address stored in the identified user data set after a change of the linkage.

8. A method for operating a passenger transport system with open ticket media and having a backend system, comprising:

storing at least one user data set containing at least one electronic medium identifier authorizing the execution of a transport trip and at least one first transport usage condition linked to the electronic medium identifier, receiving a change data set generated by an interface device in form of a validator device of the passenger transport system, the change data set containing at least one second transport usage condition, at least one first time date, and at least one user identifier for identifying a stored user data set;

wherein the second transport usage condition is a further transport usage condition different in scope of validity from or additional in scope of validity to the first transport usage condition, wherein in the second transport usage condition at least one of the following is defined: a plurality of transport trips for a plurality of full-paying users, at least one additional transport trip for a non-full-paying user, and a transport trip for a user with an additional luggage, wherein the change data set is included in a check-in data set and/or forms the check-in data set, changing the linkage between the electronic medium identifier stored in the identified user data set and the first transport usage condition for at least one future transport trip based on the received second transport usage condition, reconstructing a performed transport trip based at least on a check-in data set received from a validator device of the passenger transport system, the check-in data set containing at least the electronic medium identifier, and on a provided check-out data set containing at least the same electronic medium identifier, and generating a billing data set based at least on the reconstructed transport trip and a transport usage condition of the user data set linked with the electronic medium identifier.

* * * * *